United States Patent
Zhou et al.

(10) Patent No.: US 9,310,549 B2
(45) Date of Patent: Apr. 12, 2016

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junli Zhou, Beijing (CN); You Li, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 76 days.

(21) Appl. No.: 14/488,960

(22) Filed: Sep. 17, 2014

(65) Prior Publication Data

US 2015/0331177 A1 Nov. 19, 2015

(30) Foreign Application Priority Data

May 16, 2014 (CN) .......................... 2014 1 0209117

(51) Int. Cl.
*F21V 8/00* (2006.01)

(52) U.S. Cl.
CPC ............ *G02B 6/0081* (2013.01); *G02B 6/0073* (2013.01)

(58) Field of Classification Search
CPC ............................. G02B 6/0081; G02B 6/0073
USPC .................................. 362/633, 627, 632, 634
See application file for complete search history.

(56) References Cited

U.S. PATENT DOCUMENTS

| | | | | |
|---|---|---|---|---|
| 7,905,619 B2* | 3/2011 | Iwamoto | ........... | G02F 1/133606 362/632 |
| 8,164,703 B2* | 4/2012 | Cheng | .................. | G02B 6/0088 349/58 |
| 8,172,418 B2* | 5/2012 | Huang | .............. | G02F 1/133606 362/633 |
| 8,902,377 B2* | 12/2014 | Yu | ...................... | G02F 1/133308 349/58 |
| 8,931,946 B2* | 1/2015 | Shin | ......................... | G09F 13/18 362/607 |
| 2005/0243238 A1* | 11/2005 | Cha | ....................... | G02B 6/0088 349/58 |
| 2006/0007367 A1* | 1/2006 | Cho | .................. | G02F 1/133308 349/58 |
| 2007/0115693 A1* | 5/2007 | Shu | ......................... | G02B 6/005 362/633 |
| 2008/0007971 A1* | 1/2008 | Hsieh | ................ | G02F 1/133608 362/633 |
| 2009/0033827 A1* | 2/2009 | Chen | .................... | G02B 6/0088 349/58 |
| 2010/0165231 A1 | 7/2010 | Ho et al. | | |
| 2014/0189982 A1* | 7/2014 | Li | ......................... | A44B 99/00 24/303 |

FOREIGN PATENT DOCUMENTS

| | | |
|---|---|---|
| CN | 102798033 A | 11/2012 |
| CN | 202835065 U | 3/2013 |
| JP | 2000-194280 A | 7/2000 |

OTHER PUBLICATIONS

Office Action in Chinese Patent Application No. 201410209117.0, dated Oct. 10, 2015.

* cited by examiner

*Primary Examiner* — Laura Tso
(74) *Attorney, Agent, or Firm* — Baker Hostetler LLP

(57) ABSTRACT

The present disclosure provides a backlight module and a display device. The backlight module includes a light guide plate; an optical sheet arranged on one side of the light guide plate and provided with a first positioning part at an edge position of the optical sheet; and a mold frame arranged on the periphery of the light guide plate, wherein the mold frame includes at least a coverage part, which is located at one side of the optical sheet far away from the light guide plate and covers the edge position of the optical sheet, and a second positioning part used for coordinating with the first positioning part to realize positioning of the optical sheet is arranged on a surface of the coverage part facing the optical sheet.

14 Claims, 1 Drawing Sheet

BACKLIGHT MODULE AND DISPLAY DEVICE

CROSS-REFERENCE TO RELATED APPLICATION

The present application claims a priority of the Chinese patent application No. 201410209117.0 filed on May 16, 2014, which is incorporated herein by reference in its entirety.

TECHNICAL FIELD

The present disclosure relates to the field of display technology, in particular to a backlight module and a display device.

BACKGROUND

Due to low working voltage, low power consumption, flexible display modes, low radiation, and so on, a liquid crystal display (LCD) has been widely applied in various fields, such as the fields of computer, mobile phone, television, and measurement display. An LCD includes an LCD panel, which includes a thin-film transistor substrate, a color filter substrate and a liquid crystal molecule layer sandwiched between the two substrates. Besides, the LCD also includes a backlight module for supplying a light source to the LCD panel, so that the LCD can display images.

As shown in FIG. 1, a traditional backlight module includes a back cover 10, a bezel 20, a mold frame 30, an optical sheet 40, a light guide plate (LGP) 50, an LED lamp strip and others. As the frame of a display product becomes slimmer and slimmer, the bezel of a backlight module is required to be slimmer and slimmer, too. In the traditional backlight module, the optical sheet is positioned in the following two ways.

The first way is, as shown in FIG. 1, to process a bending structure on the back cover 10 between the mold frame 30 and the LGP 50 to form a sheet guide 10a, and to design a positioning hole 40a at an edge of the optical sheet 40 and the positioning hole 40a corresponding to the sheet guide 10a, thus facilitating the positioning assembly of the optical sheet 40 and the back cover 10 and having an effect on fixing of the optical sheet 40; however, in this structure, due to the bending structure processed on the back cover 10, it can be difficult to make the bezel of the backlight module slimmed, which causes difficulties in making the frame of the display product slimmed, too.

The second way is, to process a separated circular positioning column on the back cover, and to design a U shaped positioning recess capable of coordinating with the circular positioning column; the bezel in this structure can be slimmed to some extent relative to the bending structure of the back cover in the first way; but, it needs to reserve a certain space for producing the positioning column on the back cover, that is, the positioning column still takes up some space on the bezel, and the cost for producing the separated circular positioning column on the back cover is high, moreover, poor movement of the optical sheet often occurs in the coordination of the circular positioning column and the U shaped positioning recess.

SUMMARY

An object of the present disclosure is to provide a backlight module and a display device, to realize simple structure and effectively slimed bezel of the backlight module, so as to realize a slim frame of a display product.

The present disclosure provides the following technical solutions.

A backlight module includes:
a light guide plate;
an optical sheet arranged on one side of the light guide plate and provided with a first positioning part at an edge position of the optical sheet; and
a mold frame arranged on the periphery of the light guide plate, wherein the mold frame includes at least a coverage part, which is located at one side of the optical sheet far away from the light guide plate, and covers the edge position of the optical sheet, and a second positioning part used for coordinating with the first positioning part to realize positioning of the optical sheet is arranged on the surface of the coverage part facing the optical sheet.

Further, the first positioning part is a positioning hole structure with a hole shape, or is a positioning recess structure formed by inward depression from the surface of the optical sheet opposite to the coverage part.

The second positioning part is a positioning column structure capable of being inserted in the first positioning part.

Further, the second positioning part and the mold frame are integrally injection-molded.

Further, the backlight module also includes a back cover arranged at the side of the light guide plate far away from the optical sheet.

Further, the back cover includes a first part positioned at the side of the light guide plate far away from the optical sheet, a second part formed by bending and extending of the first part toward a direction close to the light guide plate and located at the periphery of the mold frame, and
a bezel arranged on the periphery of the second part of the back cover.

Further, the backlight module further includes a reflection sheet arranged between the first part of the back cover and the light guide plate.

Further, the backlight module further includes:
an LED lamp strip arranged at the light incident side of the light guide plate.

A display device includes the above mentioned backlight module.

The present disclosure has the following beneficial effects.

In the backlight module provided in the present disclosure, the positioning structure for positioning the optical sheet is directly made on the mold frame, to effectively reduce the width of the bezel of the backlight module and realize a slim frame of a display product.

DETAILED DESCRIPTION

The principles and features of the present disclosure are described hereinafter in conjunction with the drawings and the embodiments, and the examples are used only to illustrate the present disclosure but not to limit the scope thereof.

Regarding the problem that setting of a positioning structure on the back cover of a traditional backlight module is not in favor of bezel slimming of the backlight module, the disclosure provides a backlight module, which can effectively reduce the width of the bezel of the backlight module and realize a slim frame of the display product.

Figure 2:
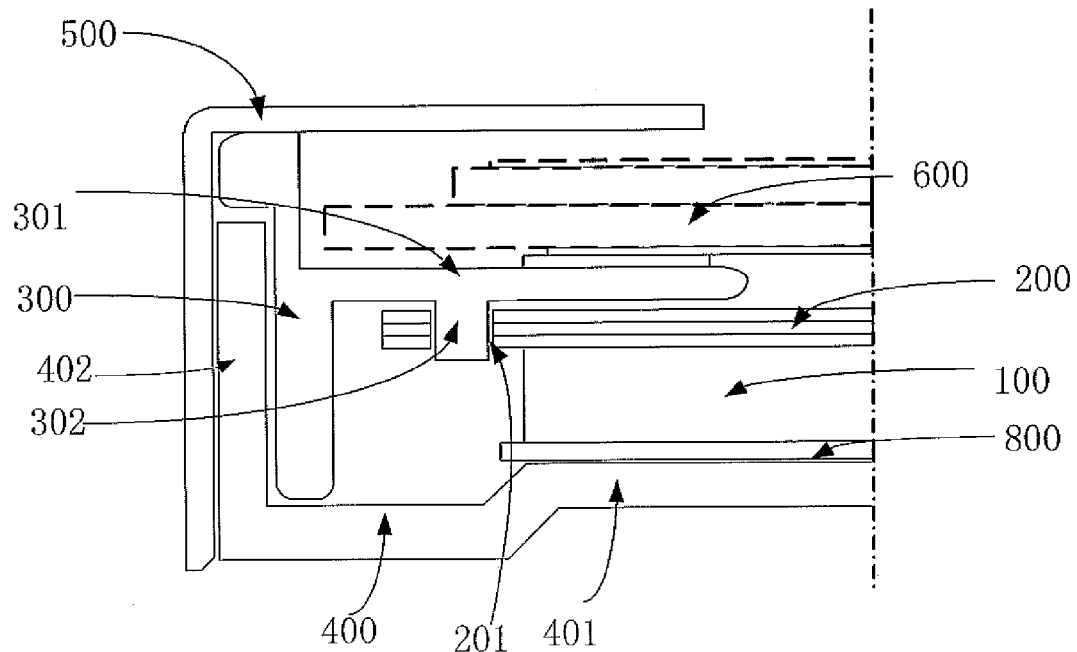
FIG. 2 is a schematic view showing a structure of a backlight module provided in the present disclosure.

As shown in FIG. 2, the backlight module provided in the present disclosure includes:

a light guide plate 100;

an optical sheet 200 arranged on one side of the light guide plate 100 and provided with a first positioning part 201 at an edge position of the optical sheet 200;

a back cover 400 arranged on a side of the light guide plate 100 far away from the optical sheet 200; and a mold frame 300 arranged on the periphery of the light guide plate 100, wherein the mold frame 300 includes at least a coverage part 301, which is located at one side of the optical sheet 200 far away from the light guide plate 100 and covers the edge position of the optical sheet 200, and a second positioning part 302 used for coordinating with the first positioning part 201 to realize positioning of the optical sheet 200 is arranged on one surface of the coverage part 301 facing the optical sheet 200.

Figure 1:
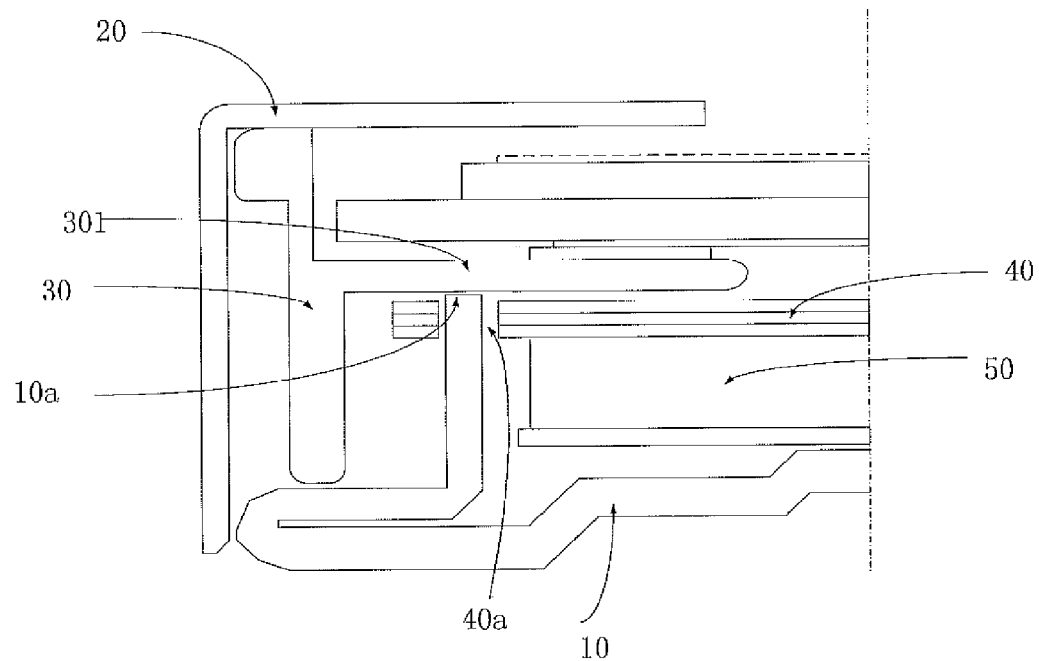
FIG. 1 is a schematic view showing a structure of a traditional backlight module.

Generally, a coverage part is arranged on the mold frame of the backlight module and formed by forming a projection toward the direction close to the light guide plate, as shown in FIGS. 1 and 2, the coverage part 301 is located at a side of the optical sheet far away from the light guide plate and covers the edge position of the optical sheet, and the coverage part 301 can be used for supporting a display panel. As shown in FIG. 2, in the present disclosure, by making the positioning structure (namely the second positioning part 302) used for positioning the optical sheet 200, on the coverage part 301 of the mold frame 300, there is no need for reserving a space on the back cover 400 of the backlight module for setting a positioning structure again, that is, the positioning structure for positioning the optical sheet 200 will not take up the space of the bezel of the backlight module, so as to reduce the width of the bezel of the backlight module effectively and realize a slim frame of the display product.

In the present disclosure, optionally, the first positioning part 201 is a positioning hole structure with a hole shape, the second positioning part 302 is a positioning column structure with a column shape and capable of being inserted in the positioning hole structure. By adopting the above solution, a traditional optical sheet having a positioning hole at the edge can be directly used as the optical sheet 200 in the present disclosure so as to reduce the processing development cost, and it only needs to make the positioning column structure directly on the mold frame 300 to realize the positioning of the optical sheet 200; besides, the coordination mode of the positioning hole and the positioning column is very firm and can reduce the occurrence of poor movement of the optical sheet 200.

It can be appreciated that, the structures of the first positioning part 201 and the second positioning part 302 may not be limited to the above, and other positioning coordination modes can be adopted, for example: the first positioning part 201 can be a positioning recess structure formed by inward depression from the surface of the optical sheet 200 opposite to the coverage part, and the second positioning part 302 has a positioning column structure capable of being inserted in the positioning recess structure, by adopting this mode, a traditional optical sheet provided with a positioning recess at the edge can be used directly as the optical sheet 200 in the present disclosure so as to reduce the processing cost, and it only needs to make the positioning column structure directly on the mold frame 300 to realize the positioning of the optical sheet 200

Besides, in the present disclosure and optionally, the second positioning part 302 and the mold frame 300 are integrally injection-molded. In the above solution, an injection molding process can be directly used to form the second positioning part 302 on the mold frame 300, so as to realize simple process and low producing cost. It is appreciated that, in the practical application, the second positioning part 302 and the mold frame 300 can also be formed by other modes, for example, the second positioning part 302 is separately made on a traditional mold frame 300, and it is unnecessary to go into details here.

In addition, in the present disclosure and optionally, as shown in FIG. 2, the back cover 400 comprises a first part 401 located on a side of the light guide plate 100 far away from the optical sheet 200 and a second part 402 formed by bending and extending of the first part 401 toward the direction close to the light guide plate 100, and the second part 402 is located at the periphery of the mold frame 300.

As shown in FIG. 1, in a traditional backlight module, since the positioning structure for positioning the optical sheet is formed from the bent part of the back cover between the mold frame and the light guide plate, a certain space is required to be reserved on the mold frame of the backlight module; in the present disclosure, by adopting the above solution, as shown in FIG. 2, the positioning structure (namely the second positioning part 302) for positioning the optical sheet 200 is set on the mold frame 300, there is no need to reserve a space for setting the positioning structure on the back cover 400, the second part 402 of the back cover 400 can be located in the peripheral area of the mold frame 300 (as shown in FIG. 2), and the space between the mold frame 300 and the light guide plate 100 is reduced, so as to make the bezel 500 slimmed and realize bezel slimming.

In addition, it needs to be also noted that, the backlight module in the present disclosure may also include: the bezel 500 set on the periphery of the second part 402 of the back cover 400; a reflection sheet 800 set between the light guide plate 100 and the first part 401 of the back cover 400; and an LED lamp strip set at a light incident side of the light guide plate 100.

Another object of the present disclosure is to provide a display device, as shown in FIG. 2, which comprises a display panel 600 and the backlight module provided in the present disclosure. Apparently, the display device provided in the present disclosure also has the beneficial effects of the backlight module provided in the present disclosure.

The above mentioned are the preferred embodiments of the present disclosure. It should be noted that, a person skilled in the art may make improvements and modifications without departing from the principle of the present disclosure, and these improvements and modifications shall also be considered as the scope of the present disclosure.

What is claimed is:

1. A backlight module, comprising:

a light guide plate;

an optical sheet arranged on one side of the light guide plate and provided with a first positioning part at an edge position of the optical sheet; and a mold frame arranged on the periphery of the light guide plate, wherein the mold frame comprises at least a coverage part, which is located at one side of the optical sheet far away from the light guide plate and covers the edge position of the optical sheet, and a second positioning part used for coordinating with the first positioning part to realize positioning of the optical sheet is arranged on one surface of the coverage part facing the optical sheet.

2. The backlight module according to claim 1, wherein,
the first positioning part is a positioning hole structure with a hole shape, or is a positioning recess structure formed by inward depression from the surface of the optical sheet opposite to the coverage part; and
the second positioning part is a positioning column structure capable of being inserted in the first positioning part.

3. The backlight module according to claim 1, wherein the second positioning part and the mold frame are integrally injection-molded.

4. The backlight module according to claim 1, wherein,
the backlight module further comprises a back cover arranged at the side of the light guide plate far away from the optical sheet.

5. The backlight module according to claim 4, wherein the back cover comprises a first part positioned at the side of the light guide plate far away from the optical sheet, a second part formed by bending and extending of the first part toward a direction close to the light guide plate and located at the periphery of the mold frame, and
a bezel arranged on the periphery of the second part of the back cover.

6. The backlight module according to claim 5, wherein,
the backlight module further comprises a reflection sheet arranged between the first part of the back cover and the light guide plate.

7. The backlight module according to claim 6, wherein, the backlight module further comprises:
an LED lamp strip arranged at a light incident side of the light guide plate.

8. A display device, comprising the backlight module according to claim 1.

9. The display device according to claim 8, wherein:
the first positioning part is a positioning hole structure with a hole shape, or is a positioning recess structure formed by inward depression from the surface of the optical sheet opposite to the coverage part; and
the second positioning part is a positioning column structure capable of being inserted in the first positioning part.

10. The display device according to claim 8, wherein the second positioning part and the mold frame are integrally injection-molded.

11. The display device according to claim 8, wherein,
the backlight module further comprises a back cover arranged at the side of the light guide plate far away from the optical sheet.

12. The display device according to claim 11, wherein the back cover comprises a first part positioned at the side of the light guide plate far away from the optical sheet, a second part formed by bending and extending of the first part toward a direction close to the light guide plate and located at the periphery of the mold frame, and
a bezel arranged on the periphery of the second part of the back cover.

13. The display device according to claim 12, wherein the backlight module further comprises a reflection sheet arranged between the first part of the back cover and the light guide plate.

14. The display device according to claim 13, wherein the backlight module further comprises:
an LED lamp strip arranged at a light incident side of the light guide plate.

* * * * *